(12) United States Patent
Welch et al.

(10) Patent No.: US 10,086,732 B2
(45) Date of Patent: Oct. 2, 2018

(54) OPERABLE TRAY TABLES FOR A VEHICULAR ARMREST

(71) Applicant: Ford Global Technologies, LLC, Dearborn, MI (US)

(72) Inventors: Ryan Welch, Ottawa Lake, MI (US); Annette Lynn Huebner, White Lake, MI (US); Kristin Ann Hellman, Walled Lake, MI (US); Matthew B. Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/388,252

(22) Filed: Dec. 22, 2016

(65) Prior Publication Data
US 2018/0178700 A1 Jun. 28, 2018

(51) Int. Cl.
| | | |
|---|---|---|
| A47B 39/00 | (2006.01) | |
| A47B 83/02 | (2006.01) | |
| B60N 3/00 | (2006.01) | |
| B60N 3/10 | (2006.01) | |
| B60N 2/75 | (2018.01) | |

(52) U.S. Cl.
CPC .......... B60N 3/002 (2013.01); B60N 2/753 (2018.02); B60N 3/102 (2013.01)

(58) Field of Classification Search
CPC ........ B60N 3/002; B60N 3/102; B60N 3/001; B60N 3/103; A47C 7/68; A47C 7/70; A47C 5/00

USPC .................................................. 297/142–145
See application file for complete search history.

(56) References Cited

U.S. PATENT DOCUMENTS

| | | | | |
|---|---|---|---|---|
| 4,040,659 | A | * 8/1977 | Arnold ................... | A47B 31/06 297/188.17 |
| 5,037,157 | A | 8/1991 | Wain et al. | |
| 5,284,314 | A | * 2/1994 | Misaras ................. | B60N 3/102 248/311.2 |
| 5,330,146 | A | * 7/1994 | Spykerman ........... | B60N 3/102 224/281 |
| 5,547,247 | A | 8/1996 | Dixon | |
| 5,562,331 | A | * 10/1996 | Spykerman .......... | B60N 2/4686 297/188.16 |
| 5,848,820 | A | * 12/1998 | Hecht ................... | B60N 2/3013 297/113 |
| 6,032,587 | A | * 3/2000 | Salenbauch .......... | B60N 2/4686 108/44 |
| 6,082,815 | A | 7/2000 | Xiromeritis et al. | |
| 6,347,590 | B1 | 2/2002 | D'Annunzio et al. | |
| 6,793,281 | B2 | 9/2004 | Duerr et al. | |
| 7,520,552 | B2 | * 4/2009 | Nakamura ................ | B60R 7/04 108/44 |
| 7,637,551 | B2 | * 12/2009 | Mahaffy ................. | B60R 7/043 224/275 |
| 8,479,665 | B2 | 7/2013 | Kim et al. | |

(Continued)

*Primary Examiner* — Mark R Wendell

(74) *Attorney, Agent, or Firm* — Vichit Chea; Price Heneveld LLP

(57) ABSTRACT

A vehicle includes an armrest rotationally operable between upright and downward positions. Stowable tray tables are slidable within the armrest between a stowed position within the armrest and a ready position extended from the armrest. In the ready position, each stowable tray table is selectively pivotable to a table position proximate a respective seating position.

16 Claims, 8 Drawing Sheets

(56) References Cited

U.S. PATENT DOCUMENTS

| | | | |
|---|---|---|---|
| 8,596,206 B2 * | 12/2013 | Legeay | B60N 3/002 108/137 |
| 9,371,026 B2 | 6/2016 | Chang et al. | |
| 2003/0071497 A1 * | 4/2003 | Ballendat | A47C 7/70 297/145 |
| 2005/0178297 A1 * | 8/2005 | Pipkin | A47B 23/00 108/25 |
| 2005/0194828 A1 | 9/2005 | Johnson et al. | |
| 2006/0220425 A1 * | 10/2006 | Becker | A47C 7/70 297/188.16 |
| 2011/0148156 A1 * | 6/2011 | Westerink | B64D 11/06 297/162 |
| 2013/0076082 A1 * | 3/2013 | Herault | B60N 2/00 297/173 |
| 2014/0252811 A1 * | 9/2014 | Whalen | B60N 3/002 297/144 |
| 2015/0165944 A1 * | 6/2015 | Almeida | B60N 2/4626 297/411.31 |
| 2016/0167555 A1 * | 6/2016 | Allen | B64D 11/0638 108/40 |
| 2016/0375810 A1 * | 12/2016 | Kong | B60N 3/002 297/145 |
| 2017/0088268 A1 * | 3/2017 | Kinard | B64D 11/0638 |
| 2017/0246973 A1 * | 8/2017 | Farooq | B60N 3/001 |

* cited by examiner

OPERABLE TRAY TABLES FOR A VEHICULAR ARMREST

FIELD OF THE INVENTION

The present invention generally relates to vehicle armrests, and more specifically, a vehicle armrest having versatile tray tables that can be stowed within the armrest and also moved proximate various seating positions for use.

BACKGROUND OF THE INVENTION

Typical vehicles include an armrest that is positioned within a rear seating portion of a passenger compartment. These armrests can include various functionalities that can include storage compartments, cupholders, electrical and data functions, and other similar features. These armrests are typically operable from an upright position where the armrest can serve as the back of a middle seating position within the rear seat of a passenger compartment. The armrest is also rotationally operable to a downward position for use by one or more occupants of the rear seat of the vehicle.

SUMMARY OF THE INVENTION

According to one aspect of the present invention, a vehicle includes an armrest rotationally operable between upright and downward positions. Stowable tray tables are slidable within the armrest between a stowed position within the armrest and a ready position extended from the armrest. In the ready position, each stowable tray table is selectively pivotable to a table position proximate a respective seating position.

According to another aspect of the present invention, a vehicle armrest includes a housing rotationally operable between upright and downward positions. A carriage is linearly operable relative to the housing between a stowed position within the housing and a ready position extended from the housing. A pair of rotationally operable tray tables are coupled to the carriage and oppositely pivotable from the ready position to respective table positions approximately perpendicular to the ready position.

According to another aspect of the present invention, an operable vehicle armrest includes an armrest housing. A carriage is operable relative to the housing between stowed and ready positions. A tray table is coupled to the carriage and rotationally operable about a pivot of the carriage between the ready position and a table position when the carriage is in the ready position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
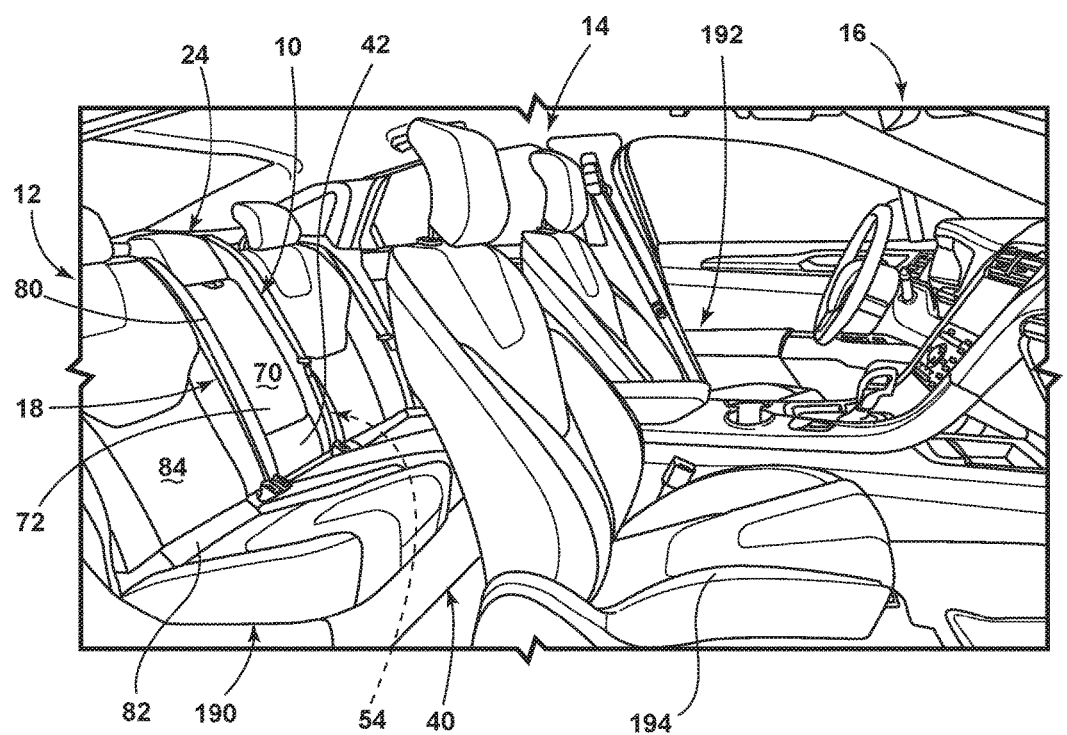
FIG. 1 is a side perspective view of a passenger compartment of a vehicle illustrating an aspect of the rear armrest in an upright position.
Figure 2:
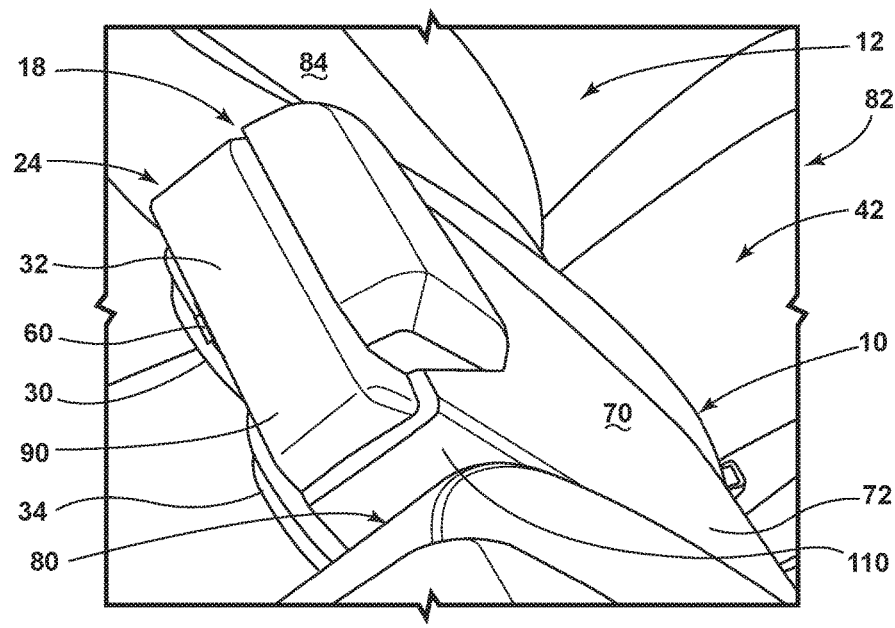
FIG. 2 is a top perspective view of the rear armrest of FIG. 1.
Figure 3:
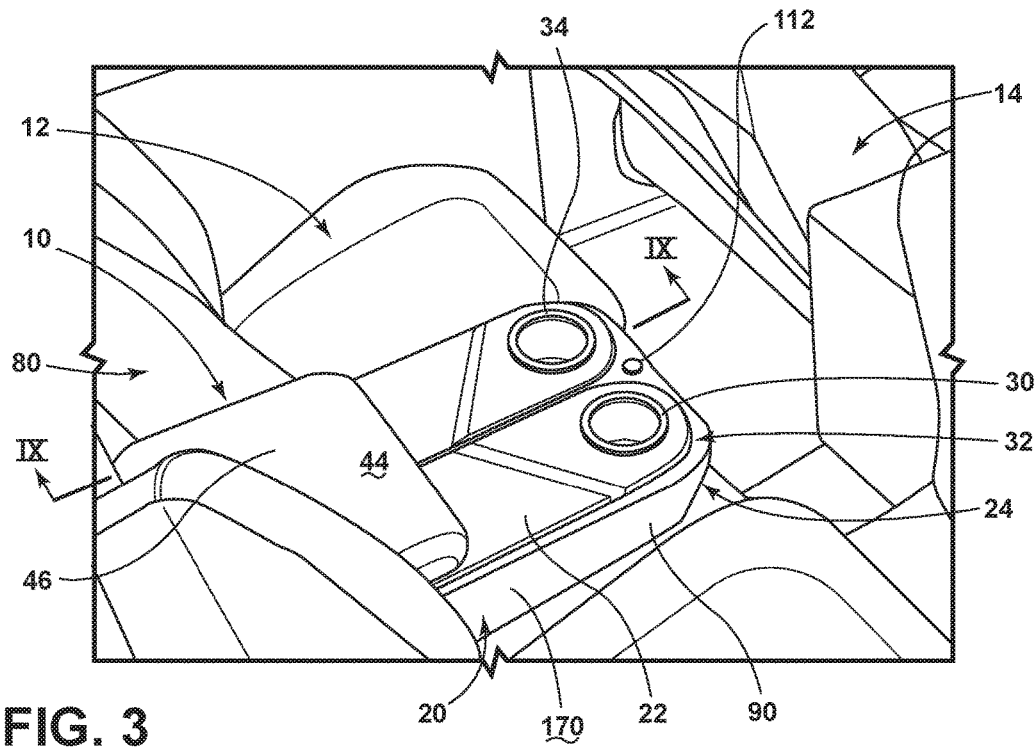
FIG. 3 is a top perspective view of an aspect of a rear armrest of a vehicle shown in a downward position and incorporating an aspect of the stowable tray tables shown in a stowed position.
Figure 4:
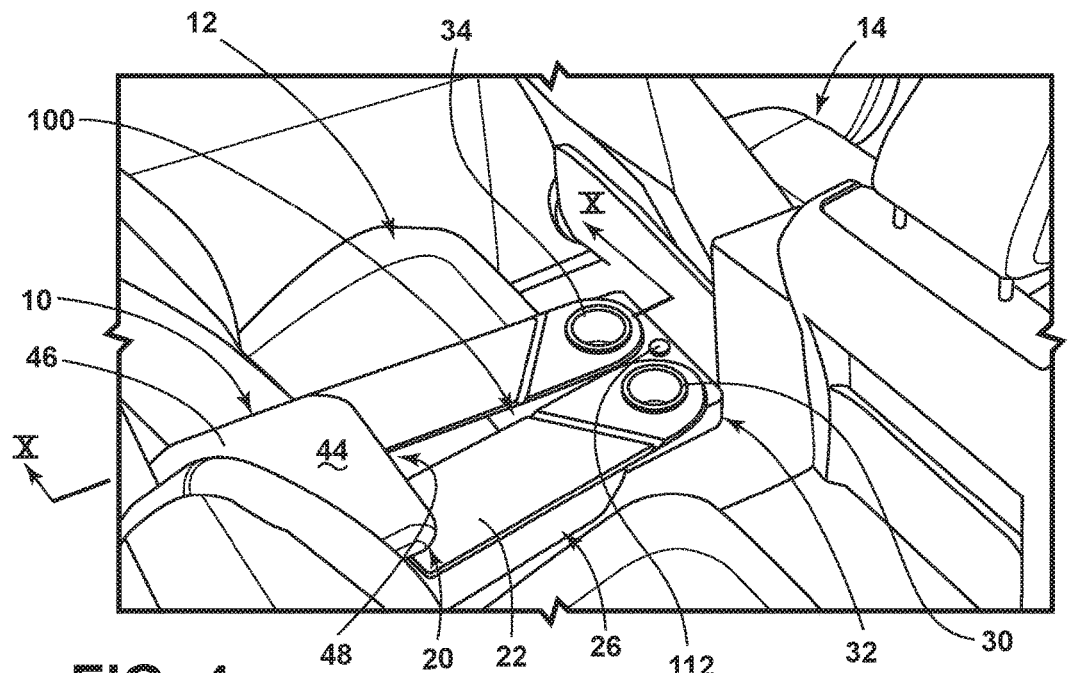
FIG. 4 is a top perspective view of the vehicle armrest of FIG. 3 showing the stowable tray tables moved into a ready position.
Figure 5:
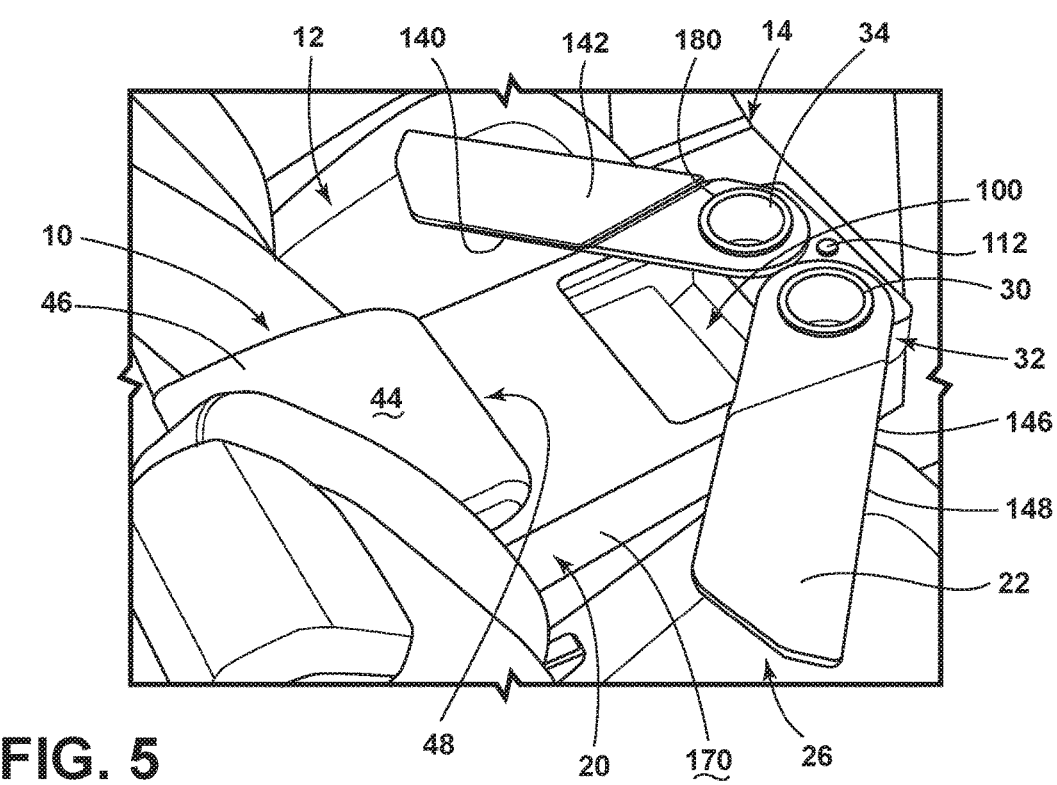
FIG. 5 is a top perspective view of the vehicle armrest of FIG. 4 showing the stowable tray tables being moved into a table position.
Figure 6:
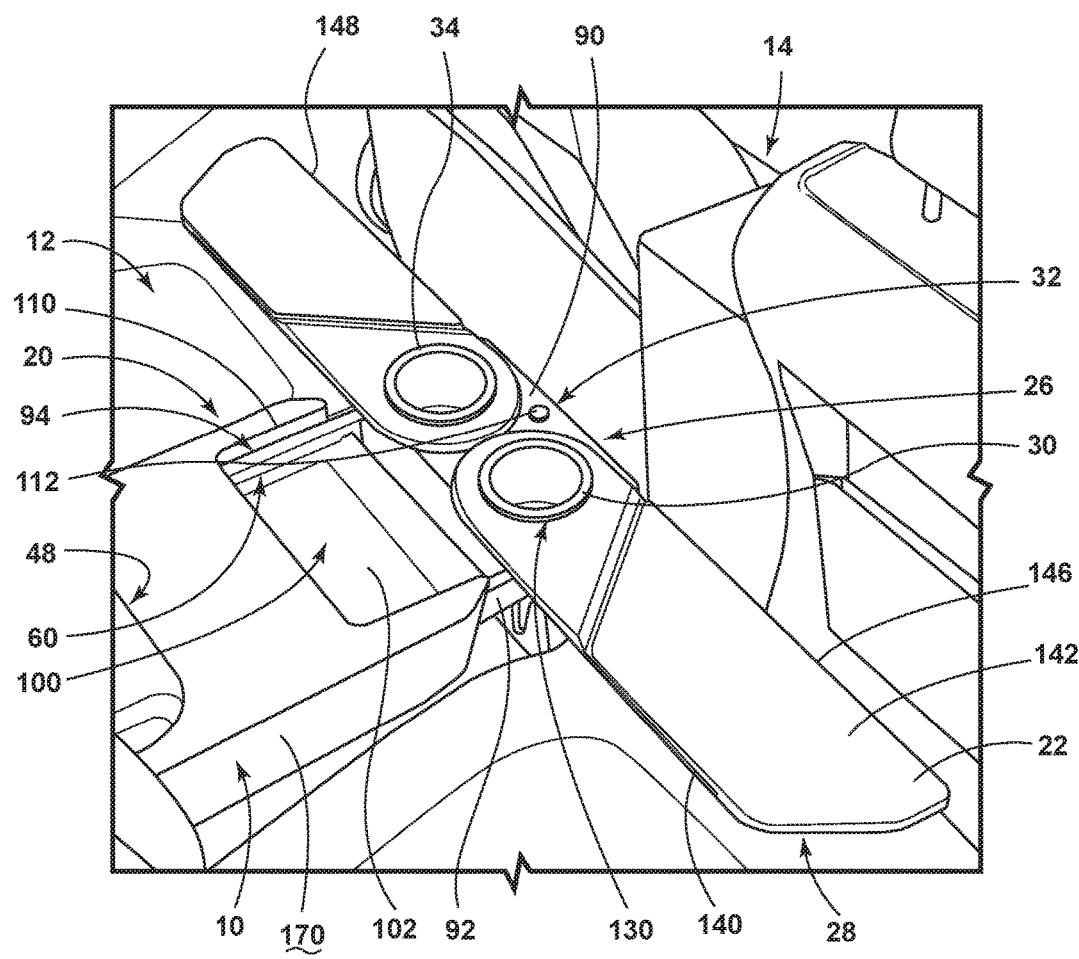
FIG. 6 is a top perspective view of the vehicle armrest of FIG. 5 showing the stowable tray tables in the table position.
Figure 7:
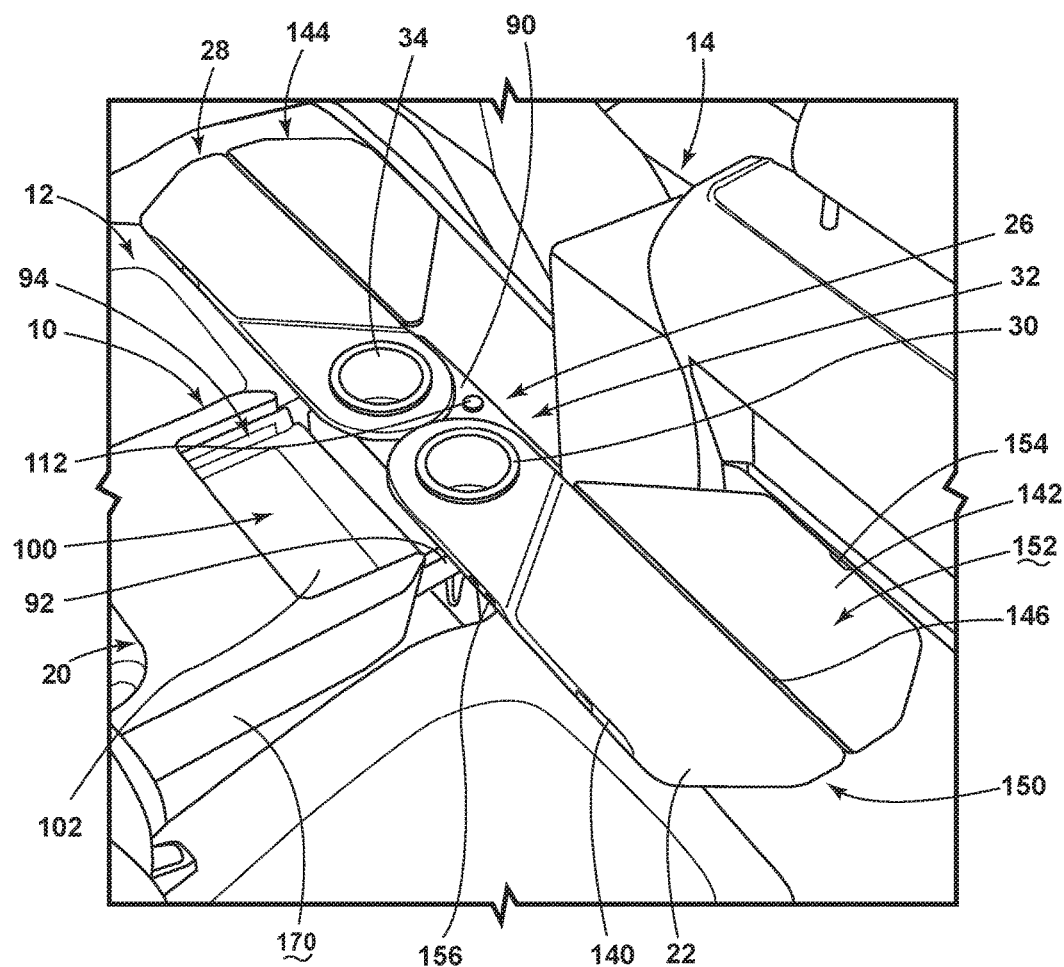
FIG. 7 is a top perspective view of the vehicle armrest of FIG. 6 showing an upper member of each stowable tray table moved into a work surface condition.
Figure 8:
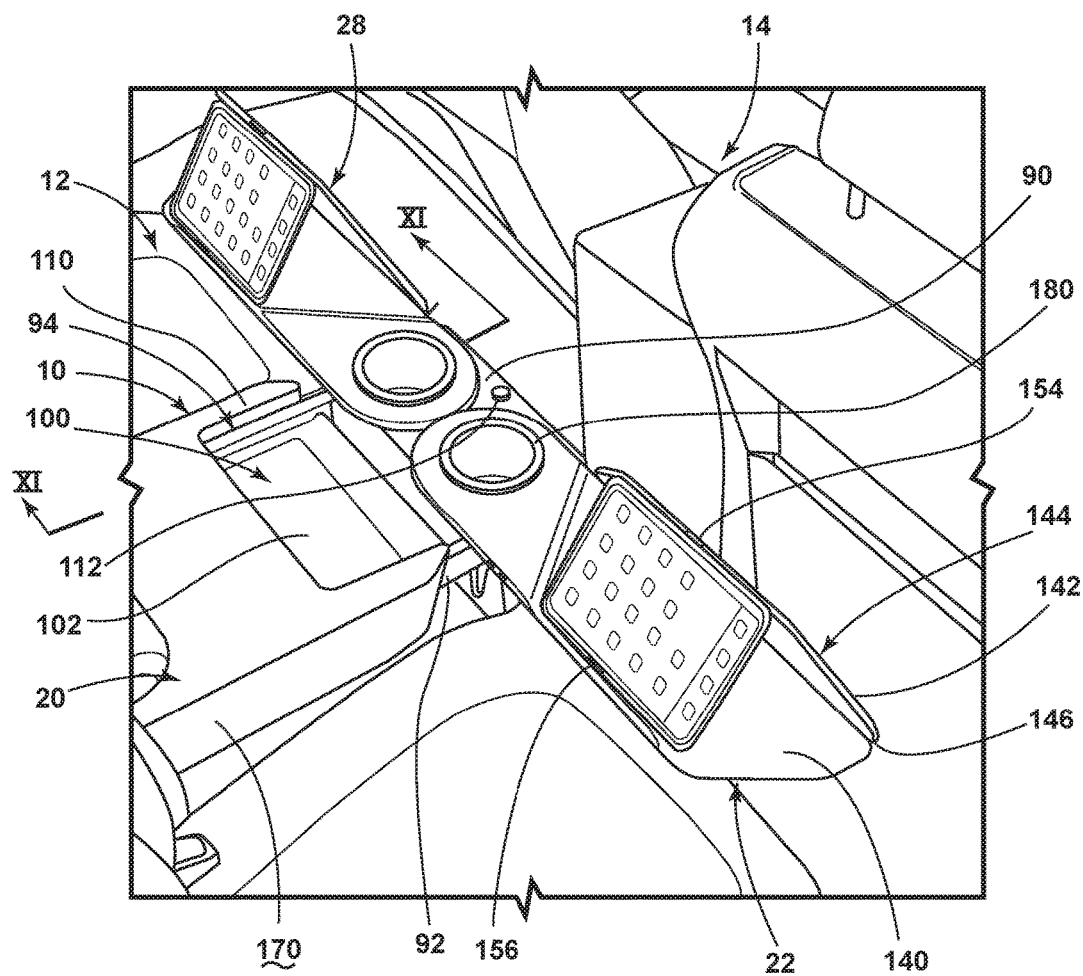
FIG. 8 is a top perspective view of the vehicle armrest of FIG. 7 showing an angular position of the upper member of each stowable tray table.
Figure 9:
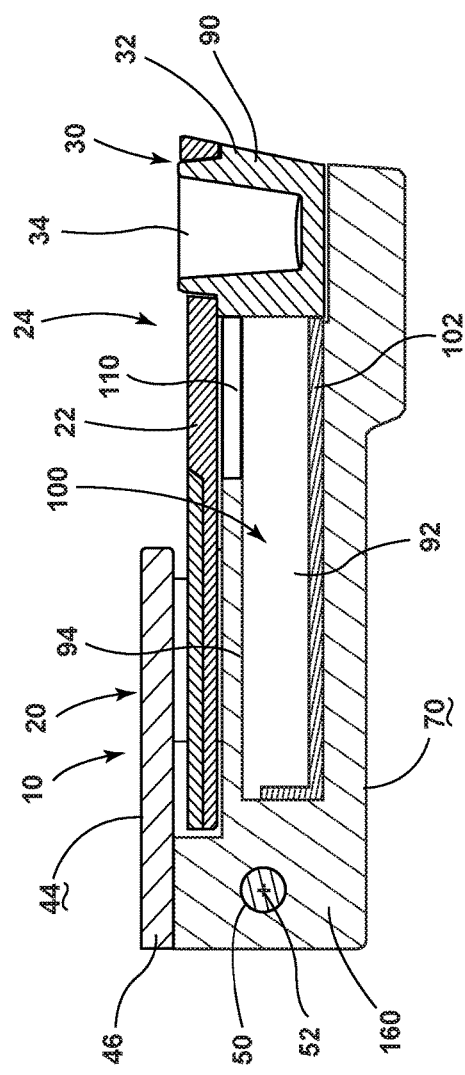
FIG. 9 is a cross-sectional view of the rear armrest of FIG. 3.
Figure 10:
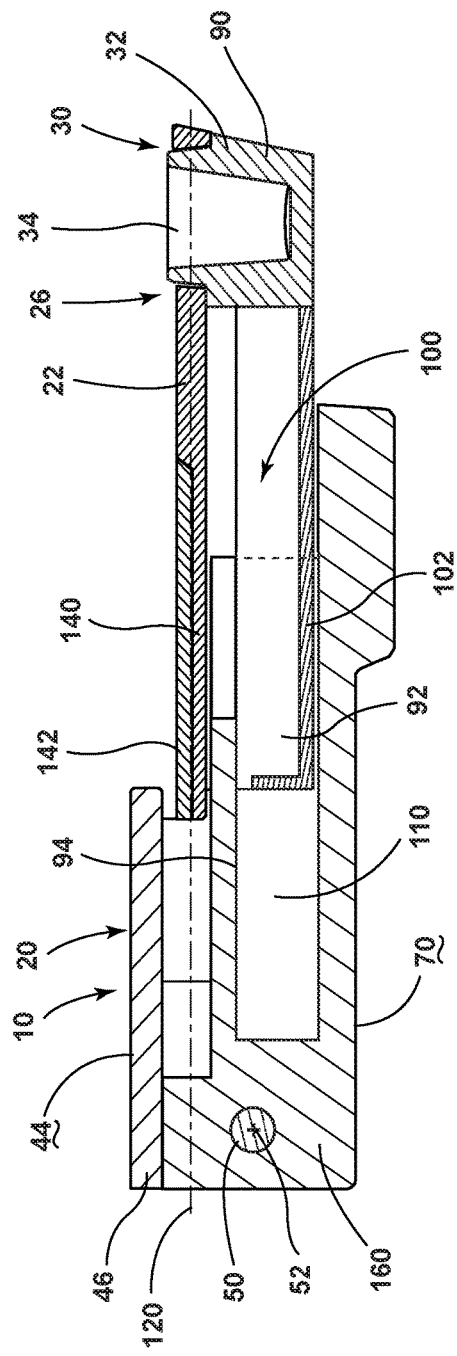
FIG. 10 is a cross-sectional view of the vehicle armrest of FIG. 4.
Figure 11:
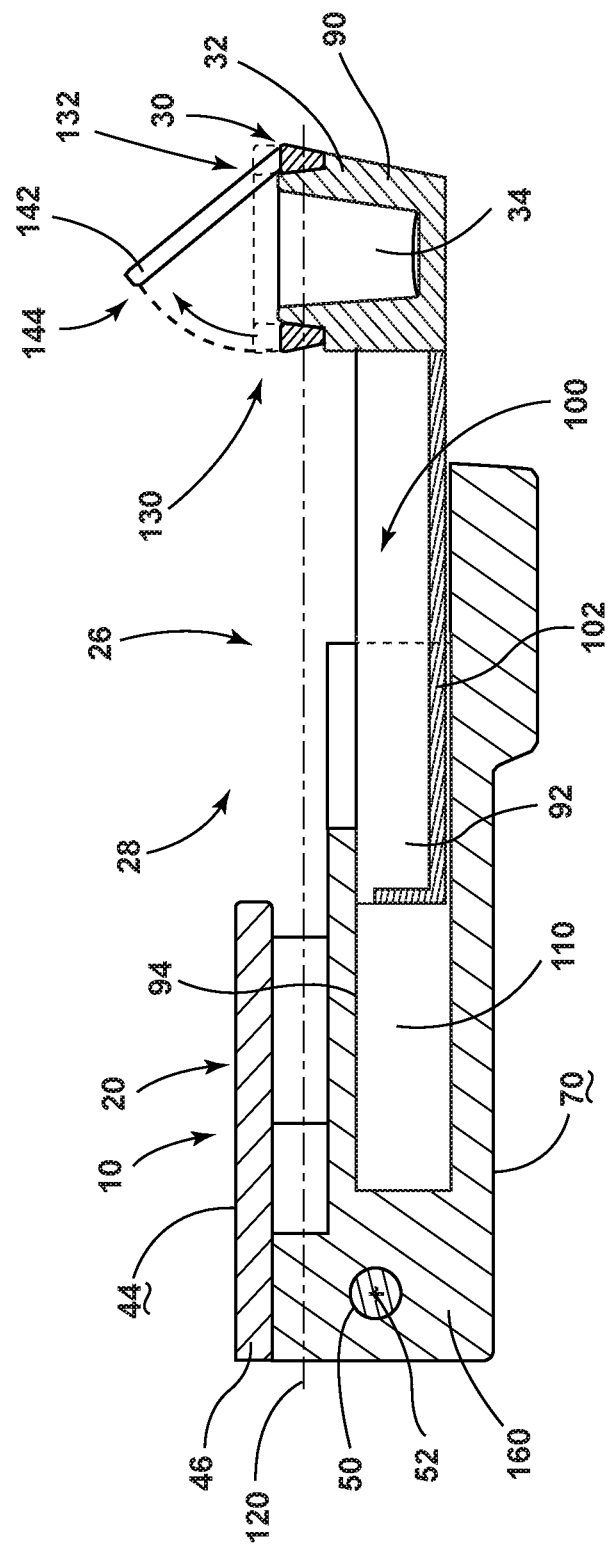
FIG. 11 is a cross-sectional view of the vehicle armrest of FIG. 8.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-11, reference numeral 10 generally refers to an armrest that can be positioned within various seating positions 12 of a passenger compartment 14 of a vehicle 16. According to the various embodiments, the vehicle 16 can include the armrest 10 that is rotationally operable between upright and downward positions 18, 20. One or more stowable tray tables 22 are slidably operable within the armrest 10 between the stowed position 24 within the armrest 10 and a ready position 26 where the stowable tray tables 22 are at least partially extended from the armrest 10. In the ready position 26, each stowable tray table 22 is selectively pivotable to a table position 28 proximate a respective seating position 12 within the passenger compartment 14 and adjacent to the armrest 10. It is contemplated that the stowable tray tables 22 are pivotable between the ready position 26 and the table position 28 about a pivot 30 that is positioned at a distal end 32 of each of the stowable tray tables 22. It is further contemplated that this pivot 30 can be defined by a cupholder 34 that is positioned within the distal end 32 of each of the stowable tray tables 22.

Referring again to FIGS. 1-11, the armrest 10 is typically positioned within a seating position 12 to the rear 40 of the passenger compartment 14 of the vehicle 16. During use of the vehicle 16, the armrest 10 can be placed in the upright position 18 to define a center seating position 42 within the rear 40 of the passenger compartment 14. The armrest 10 can be selectively moved to the downward position 20. In the downward position 20, the top surface 44 of the armrest 10 defines a location for resting an occupant's arm during use of the vehicle 16. The top surface 44 of the armrest 10 can be defined by a cushion member 46. It is contemplated that the cushion member 46 can at least partially cover, and also define, a tray receptacle 48 of the armrest 10. The tray receptacle 48 is adapted to receive the stowable tray tables 22 in the stowed position 24. The armrest 10 can include a primary pivot 50 that is typically set in a horizontal configuration to provide for rotation of the armrest 10 about a primary rotational axis 52 between the upright and downward positions 18, 20. This primary pivot 50 can extend from the armrest 10 to a structural member 54 of the vehicle 16, such as a seating frame, vehicle frame, or other similar structural member 54 of the vehicle 16.

Referring again to FIGS. 2 and 3, when the armrest 10 is in the upright position 18, it is contemplated that the armrest 10 can include a locking mechanism 60 that serves to prevent unintentional sliding operation of the stowable tray tables 22 from the stowed position 24 to the ready position 26. In this manner, bumps, impacts, and other unexpected forces may be mitigated to prevent sliding operation of the stowable tray tables 22 when not desired. When the armrest 10 is moved to the downward position 20, this locking mechanism 60 can be disengaged such that the stowable tray tables 22 can be slidably operated from the stowed position 24 to the ready position 26. The locking mechanism 60 can also be operable to lock the stowable tray tables 22 in the stowed position 24 when the armrest 10 is in the downward position 20. The locking mechanism 60 can be a latch, tab, detent, pin, hook, lever, button, combinations thereof, or other similar mechanical operating mechanism.

Referring again to FIGS. 1-3, it is contemplated that an underside 70 of the armrest 10 can define the back 72 of the center seating position 42 for the rear 40 of the passenger compartment 14. This underside 70 of the armrest 10 can be cushioned to provide for comfort of the occupant within the center seating position 42 when the armrest 10 is in the upright position 18.

Referring again to FIGS. 2 and 3, it is contemplated that the cupholders 34 that are disposed within the distal end 32 of each of the stowable tray tables 22 can be hidden from view when the armrest 10 is in the upright position 18. In this manner, the cupholders 34 and the top surface 44 of the armrest 10 can be set within an armrest pocket 80 defined within the rear seat 82 of the vehicle 16. This armrest pocket 80 can receive the armrest 10, such that the seatback surface 84 of the rear seat 82 remains substantially flush to provide for a plurality of seating positions 12 therein. Additionally, the armrest pocket 80 substantially conceals the presence of the armrest 10 when in the upright position 18.

Referring again to FIGS. 3-6, it is contemplated that the stowable tray tables 22 can each be attached to a sliding carriage 90 that operates between the stowed and ready positions 24, 26. In such an embodiment, the sliding carriage 90, which typically houses the cupholders 34 of the armrest 10, provides a single member that can be extended and retracted from the tray receptacle 48 to define the stowed and ready positions 24, 26 of the stowable tray tables 22. The sliding carriage 90 can be attached to one or more sliding rails 92 that extend into a portion of the armrest 10 and adjacent to the tray receptacle 48. The sliding rails 92 engage the armrest 10 in a sliding fashion and provide for smooth operation of the slidable carriage 90 to define the stowed and ready positions 24, 26 of the sliding carriage 90 and the stowable tray tables 22. Each of the sliding rails 92 can be set within a channel 94 defined within the armrest 10. The engagement of the channels 94 and the sliding rails 92 serves to define a smooth and consistent sliding motion of the stowable tray tables 22 and the slidable carriage 90 between the stowed and ready positions 24, 26. The engagement of the sliding rails 92 and the channel 94 can include one or more securing detents that can at least partially secure the carriage 90 in each of the stowed and ready positions 24, 26.

In various embodiments, each stowable tray table 22 can be coupled to a dedicated sliding carriage 90. Each sliding carriage 90 can be separately operable between respective stowed and ready positions 24, 26. Accordingly, a passenger to one side of the armrest 10 can operate a corresponding portion of the sliding carriage 90 from the stowed position 24 to the ready position 26. At the same time, the other portion of the sliding carriage 90 can remain in the stowed position 24. In such an embodiment, the sliding carriage 90 can be split into separately operable left and right sliding carriages 90. Each of the left and right sliding carriages 90 can be coupled to a dedicated stowable tray table 22.

Referring again to FIGS. 3-8, it is contemplated that the space between the sliding rails 92 and the sliding carriage 90 when the sliding carriage 90 is moved to the ready position 26 can serve as an additional storage compartment. Accordingly, when the sliding carriage 90 is moved to the ready position 26 and the tray tables 22 are rotated out to the table position 28, the armrest 10, the sliding carriage 90 and the sliding rails 92 cooperate to define an accessory storage area 100 therebetween. This accessory storage area 100 can include a bottom plate 102 of the sliding carriage 90 that moves with the remainder of the sliding carriage 90. When the sliding carriage 90 is moved to the stowed position 24, the bottom plate 102 at least partially enters the tray receptacle 48. Accordingly, various items placed within the accessory storage area 100 within the sliding carriage 90 can be kept at least partially within the tray receptacle 48 and covered by the stowable tray tables 22 in the stowed position 24.

Referring again to FIGS. 1-5, it is contemplated that the tray receptacle 48 disposed within a portion of the armrest 10 can serve to prevent rotation of the stowable tray tables 22 to the table position 28 when the stowable tray tables 22 are in the stowed position 24. In such an embodiment, the tray receptacle 48 can include sidewalls 110 that serve to laterally contain the stowable tray tables 22 in the stowed position 24 to prevent outward rotation at undesired times. It is also contemplated that a rotational locking mechanism 112 can secure the stowable tray tables 22 in the stowed position 24 and prevent outward rotation to the table position 28. This rotational locking mechanism 112 may serve to prevent rotation of the stowable tray tables 22 to the table position 28 when the sliding carriage 90 is in each of the stowed and ready positions 24, 26. It is contemplated that disengagement of the rotational locking mechanism 112 may allow for movement of the stowable tray tables 22 from the ready position 26 to the table position 28. The rotational locking mechanism 112 can be a latch, tab, detent, pin, hook, lever, button, combinations thereof, or other similar mechanical operating mechanism.

Referring again to FIGS. 3-6, it is contemplated that the linear movement of the sliding carriage 90 and tray tables 22 from the stowed position 24 to the ready position 26 is accomplished through a sliding motion that occurs within a single plane 120 relative to the armrest 10. It is also contemplated that the rotational movement of the tray tables 22 from the ready position 26 to the table position 28 can occur within the same single plane 120 relative to the armrest 10. Accordingly, movement of the stowable tray tables 22 can occur within a substantially small space and within the single plane 120 defined relative to the armrest 10 within the passenger compartment 14.

According to various embodiments, it is contemplated that the motion of the sliding carriage 90 from the stowed position 24 to the ready position 26 can be along a non-linear path, such as an arcuate path, a regular path, or other similar path that can be used to at least partially secure the sliding carriage 90 in the stowed and/or ready positions 24, 26. It is also contemplated that the stowable tray tables 22 can be elevated through a vertical plane 120 through operation of a vertical manipulating component 130 of the stowable tray tables 22. This vertical manipulating component 130 can be positioned proximate the pivot 30, such as the cupholder 34 or can be defined by the cupholder 34. Operation of this manipulating component 130 can serve to vertically translate one or both of the stowable tray tables 22 to a plurality of vertical positions 132 to accommodate occupants of varying size. In one example, it is contemplated that the manipulating component 130 can be in the form of a threaded portion of the cupholder 34 that can be rotated to vertically translate the cupholder 34 and, in turn, also vertically translate one or both of the stowable tray tables 22. This manipulating component 130 can also be disposed within the sliding carriage 90 and can have one or more vertical guides that serve to translate the stowable tray table 22 through the plurality of vertical positions 132.

Referring again to FIGS. 6-8, it is contemplated that each stowable tray table 22 can include a lower member 140 that is rotationally coupled to an upper member 142. In such an embodiment, in the table position 28, the upper member 142 is operable between a plurality of angular positions 144 with respect to the lower member 140. The lower and upper members 140, 142 of the stowable tray table 22 can be hingedly operable at a hinge 146 disposed along an edge 148 joining the upper and lower members 142, 140. In this manner, the upper member 142 can be operable about the hinge 146 to define the plurality of angular positions 144. These angular positions 144 can define a workspace position 150 where the upper member 142 is placed in a parallel configuration with the lower member 140 to increase the size of the workspace 152 of the stowable tray table 22 in the table position 28. It is also contemplated that the upper member 142 can be disposed in a particular angular position 144 to retain various objects therein. As exemplified in FIG. 8, an electronic device, such as a tablet or smartphone, can be secured between the upper and lower members 142, 140 of the stowable tray table 22 for use by an occupant during operation of the vehicle 16. In such an embodiment, the upper and lower members 142, 140 can include one or more retaining mechanisms 154 that serve to at least partially secure such a device between the upper and lower members 142, 140 of the stowable tray table 22. In such an embodiment, each stowable tray table 22 and/or the sliding carriage 90 can include one or more electrical ports 156 and/or data ports that can serve various electronic devices.

Referring again to FIGS. 1-11, the armrest 10 for the vehicle 16 can include a housing 160 that is rotationally operable between the upright and downward positions 18, 20. The armrest 10 can also include a carriage 90 that is linearly operable relative to the housing 160 between the stowed position 24 at least partially within the housing 160 and a ready position 26 where the carriage 90 is extended from the housing 160. A pair of rotationally operable tray tables 22 can be coupled to the carriage 90. Each of these rotationally operable tray tables 22 can be oppositely pivotable from the ready position 26 to respective table positions 28 that are approximately perpendicular to the ready positions 26. According to various embodiments, a pair of cupholders 34 can be defined within the carriage 90. These cupholders 34 can be positioned at corresponding ends 32 of the pair of tray tables 22. It is contemplated that the pair of tray tables 22 can be adapted to rotate about the pair of cupholders 34, respectively, to define the ready and table positions 26, 28 of each tray table 22.

Referring again to FIGS. 1-11, it is contemplated that the housing 160 of the armrest 10 can be defined by a rigid structure that is surrounded by various padding members and/or cushion members 46 that define the exterior surface 170 of the armrest 10. The housing 160 can serve to define at least a portion of the tray receptacle 48 that receives the stowable tray tables 22 in the stowed position 24. Accordingly, the operable armrest 10 of the vehicle 16 can include the housing 160 for an armrest 10. The sliding carriage 90 is operable relative to the housing 160 between the stowed and ready positions 24, 26. At least one tray table 22 is coupled to the carriage 90 and is rotationally operable about a pivot 30 of the carriage 90 between the ready position 26 and the table position 28. This pivotal operation of the tray table 22 between the ready and table positions 26, 28 occurs when the table is in the ready position 26. Movement of the carriage 90 to the stowed position 24 serves to retain and prevent rotation of the tray tables 22 toward the table position 28.

Referring again to FIGS. 9-11, it is contemplated that the housing 160 of the armrest 10 can include an interior space that defines at least a portion of the accessory storage area 100 defined between the armrest carriage 90 and the housing 160. In such an embodiment, the guide rails of the sliding carriage 90 can define opposing sides of this accessory storage area 100 within the housing 160. It is also contemplated that the channels 94 with the housing 160 that receive the guide rails can be separate and individual channels 94 defined within the housing 160. The central space that defines the accessory storage area 100 can be a separate open area within the housing 160 of the armrest 10.

Referring again to FIGS. 9-11, as the sliding carriage 90 operates from the stowed position 24, the carriage 90 is seated proximate the tray receptacle 48 defined by the housing 160. In this manner, the carriage 90 is matingly received within a portion of the housing 160 of the armrest 10. When the sliding carriage 90 is in the stowed position 24, the sliding carriage 90, stowable tray tables 22 and housing 160 of the armrest 10 define, visually, a unitary armrest 10 that is rotationally operable between the upright and downward positions 18, 20. The sliding carriage 90 and the stowable tray tables 22 are laterally operable from the tray receptacle 48 of the housing 160 for the armrest 10 and toward the ready position 26. In this ready position 26, the stowable tray tables 22 are positioned substantially clear of the tray receptacle 48 and are able to be rotated from the ready position 26 to the table position 28. In the table position 28, the accessory storage area 100 defined between the housing 160 of the armrest 10 and the slidable carriage 90 is substantially accessible for placing items therein. It is also contemplated that in the ready position 26, the upper member 142 of the stowable tray table 22 can be operable between the plurality of rotational positions to define an enlarged work space that is positioned adjacent to the seating position 12, rather than over a seating position 12, as would be present in the table position 28.

Referring again to FIGS. 9-11, each stowable tray table 22 is adapted to extend around a corresponding cupholder 34. The stowable tray table 22 is rotationally operable around the cupholder 34 that defines a pivot 30 for the respective stowable tray table 22. It is contemplated that an upper lip 180 or other radially extending ring of the cupholder 34 can serve to axially secure the stowable tray table 22 relative to the cupholder 34. In this manner, the stowable tray table 22 can be rotationally operable about the cupholder 34. The vertically translating manipulating component 130 of the cupholder 34 can be incorporated to vertically translate the position of the stowable tray table 22 between a plurality of vertical positions 132.

According to the various embodiments, the armrest 10 for the vehicle 16 that includes the stowable tray table 22 and sliding carriage 90 can be disposed in various portions of the passenger compartment 14 of the vehicle 16. Such locations can include, but are not limited to, second row seating 190, third row seating, and other positions in the passenger compartment 14. Such a stowable tray table 22 can be disposed within an area of front row seating 192. In such a position, it would be typical that the stowable tray table 22 is only operable, typically, with respect to the passenger seat 194 within the front of the passenger compartment 14.

According to the various embodiments, the stowable tray tables 22 can be made of various materials that can include, but are not limited to, metals, plastics, various polymers, composite materials, rubberized materials, combinations thereof, and other similar materials. It is also contemplated that portions of the stowable tray tables 22 can be wrapped or coated in an exterior layer. This exterior layer can include, but is not limited to, leather, fabric, plastic, metals, sprayable finishes, paint, spray-on coatings, combinations thereof and other similar exterior materials.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   an armrest rotationally operable between upright and downward positions; and
   stowable tray tables that are linearly slidable through a single plane within the armrest and between a stowed position within the armrest and a ready position extended from the armrest; wherein
   in the ready position, each stowable tray table is selectively pivotable within the single plane to a table position proximate a respective seating position; and
   each stowable tray table includes a lower member that is coupled to an upper member, wherein in the table position, the upper member is operable between a plurality of angular positions with respect to the lower member.

2. The vehicle of claim 1, wherein the stowable tray tables are pivotable between the ready position and the table position about a pivot positioned at a distal end of the stowable tray tables.

3. The vehicle of claim 2, wherein the pivot is defined by a cupholder.

4. The vehicle of claim 1, wherein the stowable tray tables are each attached to a sliding carriage that operates between the stowed and ready positions.

5. The vehicle of claim 4, wherein when the stowable tray tables are in the table position, the armrest and sliding carriage cooperate to define an accessory storage area therebetween.

6. The vehicle of claim 1, wherein the lower and upper members are hingedly operable at a hinge disposed along an edge joining the upper and lower members, and the upper member is operable about the hinge to define the plurality of angular positions.

7. The vehicle of claim 1, wherein the armrest includes a tray receptacle that houses at least a portion of the stowable tray tables in the stowed position.

8. The vehicle of claim 7, wherein the tray receptacle prevents rotation of the stowable tray tables to the table position when in the stowed position.

9. The vehicle of claim 7, wherein the tray receptacle is at least partially defined by an underside of a cushion member of the armrest.

10. The vehicle of claim 1, wherein the respective seating positions are within a rear of a passenger compartment of the vehicle.

11. A vehicle armrest comprising:
    a housing rotationally operable between upright and downward positions; and
    a carriage linearly operable relative to the housing between a stowed position within the housing and a ready position extended from the housing;
    a pair of rotationally operable tray tables coupled to the carriage and oppositely pivotable from the ready position to respective table positions approximately perpendicular to the ready position; and
    a pair of cupholders defined within the carriage and positioned at corresponding ends of the pair of tray tables, wherein the pair of tray tables rotate about the pair of cupholders, respectively, to define the ready and table positions of each tray table.

12. The vehicle armrest of claim 11, wherein each stowable tray table includes a lower member that is coupled to an upper member, wherein in the table position, the upper member is operable between a plurality of angular positions with respect to the lower member.

13. The vehicle armrest of claim 12, wherein the lower and upper members are hingedly operable at a hinge disposed along an edge joining the upper and lower members, and the upper member is operable about the hinge to define the plurality of angular positions.

14. An operable vehicle armrest comprising:
    an armrest housing;
    a carriage linearly operable relative to the armrest housing between stowed and ready positions through a single plane relative to the armrest housing; and
    a tray table coupled to the carriage and rotationally operable within the single plane about a pivot of the carriage between the ready position and a table position when the carriage is in the ready position.

15. The operable vehicle armrest of claim 14, wherein the tray table is selectively secured within the armrest housing when the carriage is in the stowed position.

16. The operable vehicle armrest of claim 14, wherein each stowable tray table includes a lower member that is hingedly coupled to an upper member at an edge of the lower and upper members, wherein in the table position, the upper member is operable between a plurality of angular positions with respect to the lower member.

* * * * *